United States Patent [19]

Kawanishi et al.

[11] Patent Number: 5,296,321

[45] Date of Patent: * Mar. 22, 1994

[54] PHOTORECORDING ELEMENT, METHOD FOR PRODUCTION THEREOF, AND THE LIQUID CRYSTAL CELL COMPRISING THE SAME

[75] Inventors: Yuji Kawanishi; Kunihiro Ichimura, both of Tsukuba; Takashi Tamaki, Ibaraki; Takahiro Seki, Tsukuba; Mitsuhiro Ikeda, Tsukuba, all of Japan

[73] Assignees: Agency of Industrial Science & Technology; Ministry of International Trade & Industry, Tokyo, Japan

[*] Notice: The portion of the term of this patent subsequent to Oct. 16, 2007 has been disclaimed.

[21] Appl. No.: 998,658

[22] Filed: Dec. 29, 1992

Related U.S. Application Data

[63] Continuation of Ser. No. 546,884, Jul. 2, 1990, abandoned.

[30] Foreign Application Priority Data

Jul. 3, 1989 [JP] Japan .................................. 1-171627

[51] Int. Cl.$^5$ ...................... G03C 1/73; G02F 1/1337; C09K 19/52
[52] U.S. Cl. ........................................ 430/20; 430/19; 430/945; 430/962; 428/1
[58] Field of Search ................... 430/19, 20, 945, 962; 428/1; 252/299.01

[56] References Cited

U.S. PATENT DOCUMENTS 4,963,448 10/1990 Ichimura et al. .................... 430/20
5,024,784 6/1991 Eich et al. .............................. 428/1

OTHER PUBLICATIONS

Haas et al. "UV Imaging with Nematic Chlorostilbenes" J. Electrochem. Soc., 121(12), 1974, pp. 1667-1669.
Sackman et al. "Photochemically Induced Reversible Color Changes in Cholesteric Liquid Crystals" J. Amer. Chem. Soc., 93(25), 1971, pp. 7088-7090.

Primary Examiner—Marion E. McCamish
Assistant Examiner—Kathleen Duda
Attorney, Agent, or Firm—Oblon, Spivak, McClelland, Maier & Neustadt

[57] ABSTRACT

A photorecording element consists essentially of a transparent substrate, a layer of a macromolecular compound capable of undergoing a reversible change in structure upon exposure to light, deposited by adsorption on the transparent substrate, and a liquid crystal layer disposed directly on the layer of macromolecular compound. A method for the production of the photorecording element comprises applying on a transparent substrate a mixture of a liquid crystal substance with a macromolecular compound capable of undergoing a reversible change in structure upon exposure to light and allowing the applied layer of the mixture to stand at rest or by first applying the macromolecular compound on the transparent substrate and then adding the liquid crystal substance thereto. A liquid crystal cell incorporating the photorecording element is also disclosed.

10 Claims, 1 Drawing Sheet

PHOTORECORDING ELEMENT, METHOD FOR PRODUCTION THEREOF, AND THE LIQUID CRYSTAL CELL COMPRISING THE SAME

This application is a continuation of application Ser. No. 07/546,884, filed on Jul. 2, 1990, now abandoned.

BACKGROUND OF THE INVENTION

1. Field of the Invention

This invention relates to a novel photorecording element which utilizes a change in the orientation of liquid crystal by light, to a method for the production of the photorecording element, and to a liquid crystal cell comprising the same photorecording element. More particularly, this invention relates to a photorecording element which is produced by forming on a liquid crystal by adsorption a thin film of a macromolecular compound possessing a residue capable of undergoing a reversible change of structure under the influence of light, the element being able to change the orientation of its liquid crystal layer upon irradiation with light, and to temporarily or permanently record information by utilizing the change in the orientation of the liquid crystal layer, to a method for the production of the photorecording element, and to a liquid crystal cell comprising the photorecording element.

2. Prior Art Statement

As recording elements using a liquid crystal, those which rely for storage of information upon electrical principles and those which rely for storage of information on optical principles are known to the art. Those of the former kind are chiefly used for display devices, and of those of the latter kind have been applied to photorecording.

The information stored by a liquid crystal display which displays information using electrical principles is lost when its power supply is cut off and, therefore, such displays require a special device to ensure permanent preservation of information. Further, since such displays inevitably uses patterned electrodes, they have an insufficient resolving power and prove to be unsuitable as photorecording elements of high capacity.

The liquid crystal photorecording elements which utilize optical principles include those of the type which utilize the heat generated by a laser beam or the like for causing a change in the phase of liquid crystal. Though the photorecording elements of this type are applicable to high-density photosensitive recording, their applications are limited because the recording is attained solely in the form of pits. The photorecording elements of the type which incorporate therein a compound capable of photochemically changing the structure and attain a change in the phase by the action of light upon the compound exhibit an outstanding resolving power during the early stage of the storage of input information. Because of the fluidity of liquid crystal, however, they are liable to suffer from a marked loss of resolving power with elapse of time. For example, the photochromic cholesteric liquid crystal which is obtained by dissolving azobenzene, a chiral compound, in nematic liquid crystal is transformed by the action of ultraviolet light into an isotropic phase and is enabled to record information by virtue of this transformation of phase. However, it has a disadvantage in that the liquid crystal eventually begins to flow and the recorded image begins to loss sharpness (Glossary of Lectures for the 52nd Spring Meeting of Japan Chemical Society, 1986).

An invention perfected by inventors including Kunihiro Ichimura, Takahiro Seki, and Takashi Tamaki who are found among the inventors of the invention of the subject patent application has be en already filed for a U.S. patent application under Ser. No. 07/238,398, to which a Notice of Allowance dated May 8, 1990 has been issued. The invention of this U.S. patent application consists of the following elements:

(a) Transparent substrate,
(b) Photochromic compound disposed in direct contact with said transparent substrate and capable of reversibly changing its structure on exposure to light, and
(c) Liquid crystal.

This earlier invention was intended to eliminate drawbacks suffered by the known elements described above. To be specific, it is directed to providing a photorecording element which utilizes a change in orientation of a liquid crystal caused by a light and which suffers no degradation of resolving power with elapse of time owing to the flowability of the liquid crystal.

For this element to be rendered practicable, however, it requires further improvement in quality.

OBJECT AND SUMMARY OF THE INVENTION

The inventors, after having continued a further study, have confirmed that the desired improvement in quality can be accomplished by using a macromolecular compound possessing a residue capable of undergoing a reversible change in structure by exposure to light in the place of the low molecular photochromic compound containing no polymer and used in the aforementioned element. The present invention has been perfected as a result. To be specific, it has been found that when a liquid crystal having dissolved or dispersed therein a macromolecular compound possessing a residue capable of undergoing a reversible change in structure under the influence of light is brought into contact with a substrate, the macromolecular compound is spontaneously adsorbed on the substrate and is consequently allowed to form a thin film thereon and the liquid crystal layer adjoining this thin film is reversibly oriented parallelly (homogeneously) or vertically (homeotropically) in response to the reversible change in the structure caused on the residue in the thin film by virtue of light and that the liquid crystal layer in response to the change in structure of the macromolecular compound is quickly oriented even when the thickness of the macromolecular compound is not less than 10,000 times the thickness of the liquid crystal and the liquid crystal layer remains unchanged and the information is retained for an extended period so long as the state of the light is not changed. The present invention has been perfected on the basic of this knowledge.

This invention consists essentially of the following elements.

(1) A photorecording element consisting essentially of (a) a transparent substrate, (b) a layer of a macromolecular compound capable of undergoing a reversible change in structure upon exposure to light, deposited by adsorption on the substrate, and (c) a layer of liquid crystal deposited directly on the layer of the macromolecular compound.

(2) A method for the production of the photorecording element mentioned above, which essentially consists in applying on a transparent substrate a mixture of a liquid crystal substance with a macromolecular compound capable of undergoing a reversible change in structure upon exposure to light and allowing the applied layer of the mixture to stand at rest.

(3) A method for the production of the aforementioned photorecording element, which essentially consists in applying on a transparent substrate a macromolecular compound capable of undergoing a reversible change in structure upon exposure to light and applying further thereon a liquid crystal substance.

(4) A liquid crystal cell, comprising a liquid crystal layer, layers of a macromolecular compound capable of undergoing a reversible change in structure upon exposure to light, one each superposed on the opposite surfaces of the liquid crystal layer, and substrates one each superposed on the outer surfaces of the layers of the macromolecular compound, providing that the layers of the macromolecular compound are deposited fast by adsorption on the substrates and at least one of the two substrates is transparent.

In the photorecording element, the method for the production of the photorecording element, and the liquid crystal cell described above, the macromolecular compound forming the aforementioned layers of macromolecular compound is desired to consist of a photochromic residue and a backbone polymer.

The term "photochromic residue" as used herein refers to the residue of a photochromic compound (particularly azobenzene) due to photogeometric isomerization and the term "backbone polymer" refers to one member selected from the group consisting of polyvinyl alcohols, polyimide resins, poly(meth)acrylic esters, poly(meth)-acrylamides, and polystyrene. The constitutional unit of the photochromic residue must be at least 0.1, based on the total of the constructional units of the backbone polymer taken as unity (1).

The above and other features and objects of the invention will become apparent with the following detailed description made with reference to the attached drawings.

DETAILED DESCRIPTION OF THE PREFERRED EMBODIMENTS

Figure 1:
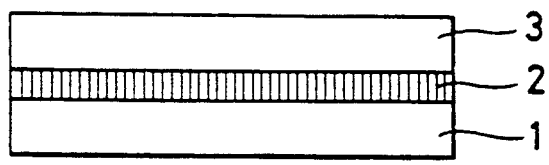
FIG. 1 is a cross section illustrating the basic construction a photorecording element of the present invention.

As the transparent substrate in the present invention, sheets of various materials such as ordinary silica glass, hard glass, quartz, and various plastics and the same sheets having a coating of such a metal oxide as silicon oxide, tin oxide, indium oxide, aluminum oxide, titanium and dioxide, chromium oxide, and zinc oxide and a coating of silicon nitride and silicon carbide deposited on their surface are usable. Optionally, the transparent substrate may be treated in advance with a surface-treating agent such as, for example, an amphoteric compound or a silylating agent.

Generally, liquid crystals are used in a construction sandwiched between two substrates. In the present invention, it suffices that at least one of the two substrates be transparent. Optionally, the other substrate may be a sheet which is either made of or coated with such a material as copper, iron, aluminum, or platinum. These substrates are generally used each in the form of a flat and smooth sheet that is 0.01 to 1 mm in wall thickness.

The present invention requires formation on the aforementioned substrate of an adsorbed thin film of a macromolecular compound possessing a residue capable of undergoing a reversible change of structure upon exposure to light. As the compound for forming this residue, a photochromic compound is generally used.

This term "photochromic compound" refers to a compound which undergoes a change in structure upon exposure to light and consequently changes its behavior, e.g. assumes a particular color tone, in response to light. To date, a wide variety of compounds which utilize photogeometric isomerization, valency photoisomerization, heterolytic photo ring opening and closing reaction, photo ring closing reaction and phototautomerization reaction of unsaturated double bonds between carbon and carbon, between carbon and nitrogen, and between nitrogen and nitrogen have been known to the art ("Photochromism", compiled by G. H. Brown and published by Wiley InterScience Company, 1971). of these compounds, typical photochromic compounds using photogeometric isomerization include those having azobenzene, indigo, thioindigo, selenoindigo, perinaphthoindigo, hemiindigo, hemithioindigo, stilbene, polyene and azomethine as main structures. Typical photochromic compounds using the heterolytic photo ring opening and closing reaction include those having indolinospirobenzopyran, indolinospironaphthooxazine, benzothiazolinospirobenzopyran, indolinospirobenzothiopyran, and spiroindolizine as main structures. Typical photochromic compounds using the photo ring closing reaction include those having stilbene and fulgide as main structures. And typical photochromic compounds using the phototautomerization reaction include those having salicyclidene anil, o-hydroxyazobenzene, and o-nitrobenzyl as main structures.

Among the compounds cited above, the photochromic compounds which use photogeometric isomerization prove to be particularly desirable.

The macromolecular compound possessing the photochromic residue of the foregoing description to be used in the present invention may be produced by preparing a monomer possessing a photochromic unit and subjecting this monomer to polymerization or by causing a photochromic compound to be bound to a polymer by the known reaction ["Synthesis and application of Photofunctional Macromolecular Compounds", written by Masahiro Irie and published by C. M. C. K.K. (1984)]. In this case, the photochromic residue may be incorporated in the main chain of a polymer or linked to the side chain thereof. From the standpoint of enabling the light-induced reversible change of structure to occur with high efficiency, it is more desirable for the photochromic residue to be linked to the side chain.

The backbone polymers which are usable herein for the formation of the macromolecular compound possessing the photochromic residue as contemplated by the present invention include polyvinyl alcohols, polyimide resins, poly(meth)acrylic esters, poly(meth)acrylic amides, poly(L-glutamic esters), poly(L-lysine), polystyrene, polyesters, polyamides, polysiloxane, and polysulfones, for example. Among the backbone polymers mentioned above, polyvinyl alcohols, polyimide resins, poly(meth)acrylic esters, poly(meth)acrylic amides, and polystyrene prove to be particularly desirable.

The macromolecular compound possessing the photochromic residue is adsorbed on the substrate. This adsorption originates in the interaction between dipoles, hydrophobic interaction, ionic interaction, or charge-transfer type interaction, for example.

In the present invention, the constitutional unit of the photochromic residue must be at least 0.1, based on the total of the constitutional units of the macromolecular compound taken as unity (1). This ratio of constitutional units will be referred to hereinafter as the "unit ratio". The greatest unit ratio is 1.

If the unit ratio of the residue incorporated in the macromolecular compound is less than 0.1, the liquid crystal does not undergo any discernible reversible change in structure under irradiation by light.

Now, the methods for the production of the photorecording elements of the present invention will be described below.

The first method comprises preparing a mixture of a liquid crystal with a macromolecular compound capable of undergoing a light-induced reversible change in structure (wherein the macromolecular compound is either dispersed or dissolved in the liquid crystal), applying this mixture on a transparent substrate, and allowing the applied layer of the mixture to stand at rest for a prescribed period. In this case, the application of the mixture is desired to be carried out by the spin coating method. By the first method described above, the photorecording element contemplated by this invention can be obtained.

The second method comprises preparing a solution containing a macromolecular compound capable of undergoing a light-induced reversible change in structure, applying this solution on a substrate by casting (as by the use of a brush) or spin coating thereby forming a layer of the macromolecular compound on the substrate, and then forming a layer of liquid crystal on the layer of the macromolecular compound. When this method fails to produce the element aimed at by the present invention, the superposed layers obtained above must be heated. Though the temperature of this heating varies with the kind of macromolecular compound, liquid crystal, and substrate to be used, it is desired to fall in the neighborhood of the liquid crystal phase/isotropic phase transition point between 50° C. and 1500° C. If this temperature is unduly high, the heating results in such undesirable phenomena as decomposition and breakage of the macromolecular compound, liquid crystal, and substrate. If the temperature is lower than the lower limit of the range mentioned above, the heating has no effect.

In either of the methods, the thin film of macromolecular compound is formed on the substrate and the layer of liquid crystal is formed directly on the thin film finally.

It suffices for this thin film of macromolecular compound to have a monomolecular thickness, specifically anywhere in the range of several μm to some tens of Å.

In either of the methods of production, the concentration of the macromolecular compound in the liquid crystal is only required to be such that it will allow formation of an adsorbed film of the macromolecular compound fulfilling the requirements defined above. To be specific, this concentration depends on such factors as the quality of the liquid crystal, macromolecular compound, and substrate and the thickness of the cell.

In order for the liquid crystal to form a clear recorded image in consequence of a reversible change in structure, the liquid crystal molecules are desired to assume a homogeneous orientation in which the major axes of the individual liquid crystal molecules are all directed in the same direction. In this connection, the macromolecular compound possessing the photochromic residue is required to impart anisotropy to the clear substrate on which the macromolecular compound is deposited by adsorption. For the impartation of anisotropy, the method of causing such an oxide as $SiO_2$ to be vacuum deposited in a diagonal direction on the transparent substrate or the method of finely deforming the surface of the transparent substrate by a rubbing treatment proves to be effective. When the substrate is a polymer sheet, the method of preliminarily rubbing or stretching the polymer sheet or the method of forming on the polymer sheet an adsorbed thin film of the macromolecular compound possessing the photochromic residue and thereafter stretching the polymer film may be adopted.

The liquid crystal for the formation of the liquid crystal layer on the adsorbed thin layer of the compound capable of undergoing a reversible change in structure upon exposure to light can be freely selected from among the conventional liquid crystal substances of the nematic system, the smectic system, and the cholesteric system. A liquid crystal substance of the smectic system selected for use in this invention must be capable of assuming a nematic liquid crystal phase at a certain temperature. The liquid crystal substances available for this invention comprise not merely those of low molecular weight but also those of high molecular weight.

The liquid crystal substances of the foregoing description are described in A. Beguin et al, "Molecular Crystals and Liquid Crystals", Vol. 115, page 1. The liquid crystal substances of high molecular weight are described in "Advances in Polymer Science", Vols. 60/61 (1985), for example. These liquid crystal substances may be used either singly or in the form of a mixture of two or more members.

Low molecular weight liquid crystals usable in this invention include:
p-(n-alkyl)phenyl p-(n-alkyl)benzoates
p-(n-alkyl)phenyl p-(n-alkoxy)benzoates
p-(n-alkoxy)phenyl p-(n-alkyl)benzoates
p-(n-alkoxy)phenyl p-(n-alkoxy)benzoates
4-(n-alkyl)-4'-cyanobiphenyls
4-(n-alkyl)-4'-cyanoterphenyls
p-(n-alkyl)phenyl 4-(n-alkyl)cyclohexanecarboxylates
p-(n-alkoxy)phenyl 4-(n-alkyl)cyclohexanecarboxylates
1-(n-alkyl)-4-(p-cyanophenyl)cyclohexanes
1-(n-alkyl)-4-(p-alkylphenyl)cyclohexanes
4-(n-alkyl)-4'-[(4''-alkylcyclohexyl)cyclohexyl]benzenes where the number of carbon of alkyl or alkoxy is between 1 and 8.

Polymeric liquid crystals having the following repeating units are also usable.

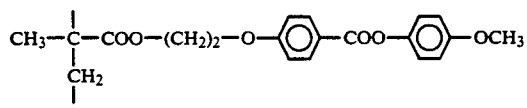
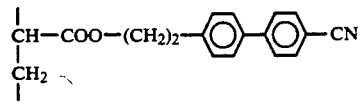
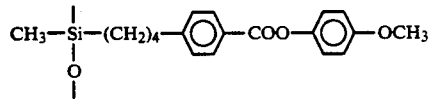
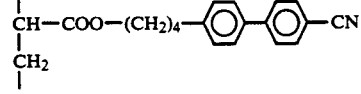
This invention further contemplates incorporation of a dichromatic coloring matter in the liquid crystal layer. Typical dichromatic coloring matter available for this incorporation are shown below.
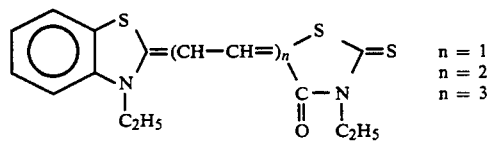
n = 1
n = 2
n = 3
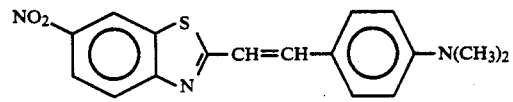
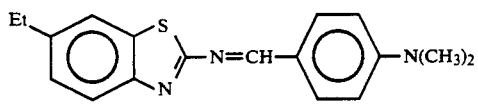
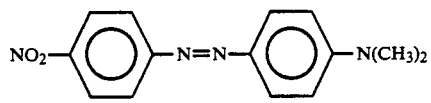
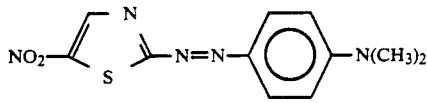
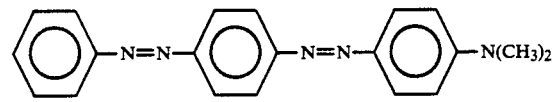
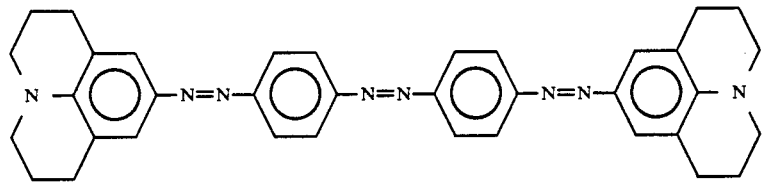
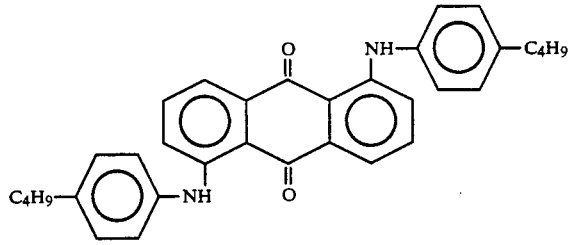
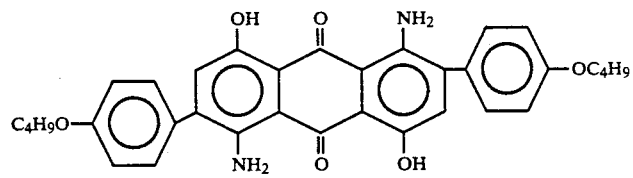
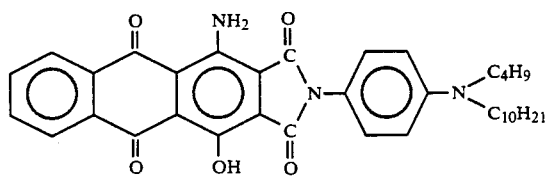
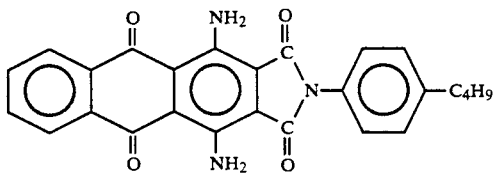

-continued

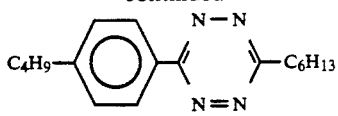

The content of the dichromatic coloring matter in the liquid crystal layer is desired to be in the range of 0.1 to 10% by weight, preferably 0.5 to 5% by weight.

Now, the present invention will be described further in detail below with reference to the accompanying drawings.

FIG. 1 is a cross section illustrating the basic construction of a photorecording element of the present invention. On a transparent substrate 1, a thin film 2 of a macromolecular compound possessing a residue capable of undergoing a reversible change in a structure upon exposure to light is deposited by adsorption and a liquid crystal layer 3 is superposed thereon. For the purpose of preventing the liquid crystal 3 from dispersion or breakage, the liquid crystal layer 3 is covered with another substrate (not shown). The substrate used for the covering may be transparent or opaque. It may have deposited by spontaneous adsorption on the surface thereof a macromolecular compound capable of undergoing a reversible change in structure upon exposure to light. It may be otherwise coated with a homogeneous orientation layer having an ability to array liquid crystal molecules parallelly to the surface.

Figure 2:
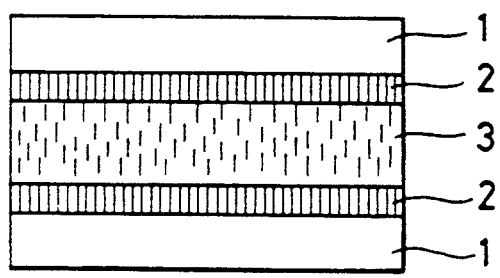
FIG. 2 is a cross section illustrating a typical liquid crystal cell according with the present invention.

FIG. 2 is a cross section illustrating a typical liquid crystal cell incorporating therein a photorecording element as one embodiment of the present invention. This liquid crystal cell is so constructed as to have a liquid crystal layer sandwiched between two substrates 1 each having formed on the surface thereof a thin film 2 of the macromolecular compound possessing the photochromic residue.

Figure 3:
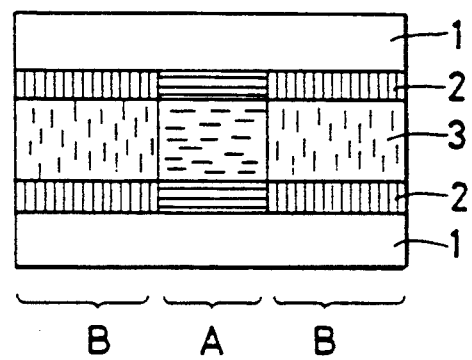
FIG. 3 is a cross section illustrating the state assumed by the liquid crystal cell of FIG. 2 after irradiation with light.

FIG. 3 depicts the state which the liquid crystal cell of FIG. 2 assumes after irradiation with light. Prior to the irradiation with the light, owing to the action of the adsorbed thin film of the photochromic macromolecular compound, the liquid crystal molecules in the liquid crystal layer 3 are regularly arranged in the direction perpendicular (homoetropic) to the surface of the substrate. When a portion (A) of the photorecording element is exposed to light, since the photochromic residue in the corresponding portion undergoes a change in structure, the aforementioned vertical arrangement in the affected portion is disrupted and the liquid crystal molecules in this portion are rearranged parallelly (homogeneously) to the surface as illustrated in FIG. 3. When this liquid crystal cell is interposed between two perpendicularly crossed polarizers, since the portion (B) not exposed to light is dark and the portion (A) exposed to light changes bright, the information carried by the light can be read out owing to the transmittance of light. Since the light usable for reading out this information has a wavelength incapable of causing photochromism, the reading by the use of this light does not disrupt the information.

Figure 4:
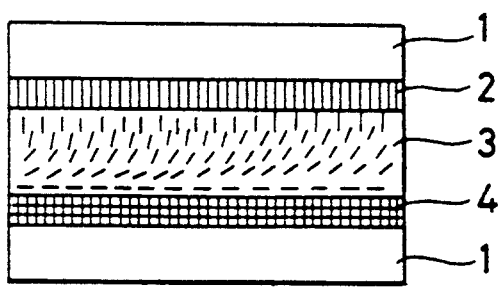
FIG. 4 is a cross section illustrating another typical liquid crystal cell according with the present invention.

FIG. 4 depicts an embodiment different from that of FIG. 2. In this embodiment, a homogeneous orientation layer 4 of a macromolecular compound is formed on one of the two substrates. This homogeneous orientation layer may be formed either by rubbing the surface of the substrate with polyvinyl alcohol, polyimide resin, or polyoxyethylene or by vacuum depositing such an oxide as $SiO_2$ diagonally on the surface of the substrate.

Figure 5:
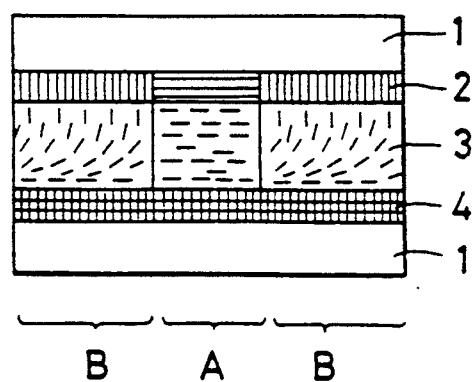
FIG. 5 is a cross section illustrating the state assumed by the liquid crystal cell of FIG. 4 after irradiation with light.

In this embodiment, while the liquid crystal molecules are arranged in the direction perpendicular to the surface of the substrate as illustrated in FIG. 4 on the side of the thin film of the macromolecular compound possessing the photochromic residue, those on the homogeneous orientation layer side are arranged in the direction parallel to the substrate. When this photorecording element is exposed to light, since the liquid crystal molecules in the portion (A) exposed to light are arranged parallelly to the surface as illustrated in FIG. 5, the whole cell assumes a homogeneous orientation. In the same manner as above, the information carried by the light can be read out by means of polarization. In the photorecording element of the present invention, erasure of the recorded information can be accomplished by exposing the cell to light of a wavelength different from that of the light used during the course of recording, thereby reverting the structure of the photochromic compound.

When the liquid crystal layer has a dichromatic coloring matter incorporated in advance therein, the information can be read out by virtue of the density of the coloring matter without requiring the use of a polarizer.

As the dichromatic coloring material, any of those coloring materials described in Naotake Matsumura, "Dyeing Industry", Vol. 32, p. 215 (1984) can be used.

In this case, permanent recording by virtue of the density of the dichromatic coloring matter can be attained by using a liquid crystal substance possessing temperature dependency such as, for example, a liquid crystal substance incapable of undergoing a change in structure on exposure to light and capable of undergoing a change in structure on exposure to light in the presence of heat of a temperature exceeding a certain level.

The photorecording element of the present invention has the advantage of showing none of the drawbacks of the recording of information with the conventional photochromic material such as, for example, the drawback that the information once recorded gradually disappears with repetition of reading. Moreover, since the arrangement of the liquid crystal is regulated by the adsorbed thin film of the photochromic macromolecular compound, the resolution with the liquid crystal possessing flowability far excels that with the liquid crystal incorporating the conventional photochromic compound therein.

Besides being used for reversible storage of optical information, the photorecording element of the present invention can be advantageously used as a optical-address type display.

Compared with the element disclosed by the invention of U.S. patent application Ser. No. 07/238,398, the element of the present invention enjoys the following strong points.

In the photorecording element of this invention, since the macromolecular compound is not required to form a monomolecular layer, the quality and the shape of the substrate can be varied widely.

The macromolecular compound in the photorecording element of this invention possesses strong adsorptive force to the substrate as compared with a low molecular compound and the thin film of this compound deposited by adsorption on the substrate does not peel off readily and possesses high tenacity.

In the method of production contemplated by the present invention, the macromolecular compound is applied in the form of a solution to the substrate. Thus, the thin film of the macromolecular compound is formed with ease.

The formation of the liquid crystal cell can be easily attained by interposing the mixture of the macromolecular compound with the liquid crystal between the opposed substrates.

Further, in the present invention, the thin film of macromolecular compound which regulates the arrangement of the liquid crystal is deposited by adsorption on the surface of the substrate. By a very simple method of interposing the liquid crystal containing the macromolecular compound between two opposed substrates prepared in advance for construction of a liquid crystal cell, therefore, the liquid crystal cell as a photorecording element can be produced. This is the technique which has been accomplished for the first time in art by the present invention and contributes immensely to the industry.

Now, the present invention will be described more specifically below with reference to working examples.

EXAMPLE 1

A macromolecular compound (1) possessing an azobenzene unit as a photochromic residue was obtained by subjecting 4-methacryloyloxyazobenzene synthesized by the conventional method to radical polymerization under deoxidizing conditions using benzene as a solvent and 2,2'-azobis(isobutyronitrile) as an initiator. In this macromolecular compound, the unit ratio of the azobenzene residue was 1. In 100 ml of phenyl cyclohexane carboxylate type nematic liquid crystal (produced by Rodic Corp. and marketed under trademark designation of "DON 103"), 1 mg of the macromolecular compound (1) was dissolved as heated at 100° C. The resultant solution was cooled to normal room temperature and filtered to remove insolubles. Between two glass substrates spin coated in advance with a 20% toluene lecithin (produced by Tokyo Kasei K.K.) solution under the conditions of 600 r.p.m., a macromolecular compound (1)/liquid crystal mixture was interposed through the medium of glass rod spacers 8 μm in thickness to produce a liquid crystal cell. The liquid crystal cell thus obtained was constructed as illustrated in FIG. 2. In the cell, the liquid crystal molecules were oriented perpendicularly. When the cell was interposed between two perpendicularly crossed polarizers, it passed absolutely no light and gave a dark image. When this cell was exposed to the ultraviolet light of 365 nm obtained by filtering the light from a mercury vapor lamp, there was induced photoisomerization of the azobenzene unit from trans to cis and, as a result, the orientation of the liquid crystal molecules was changed to the horizontal direction and the birefringence was proportionately changed. When the cell was interposed between two perpendicularly crossed polarizers, it passed light and gave a bright image. When this cell was subsequently exposed to the visible light of not less than 440 nm obtained by similarly filtering the light from a mercury vapor lamp, photoisomerization of the azobenzene unit from cis to trans was induced and, as the result, the liquid crystal molecules changed their orientation to the vertical direction and the cell again ceased to pass polarized light. The reversible change in liquid crystal orientation in consequence of alternate exposure to ultraviolet light and visible light could be repeated as often as desired.

EXAMPLE 2

A macromolecular compound (2) possessing an azobenzene unit as a photochromic residue was obtained by subjecting 4-methacryloyl aminoazobenzene synthesized by the conventional method to radical polymerization under deoxidizing conditions using acetone as a solvent and 2,2'-azobis(isobutyronitrile) as an initiator. In the macromolecular compound, the unit ratio of the constitutional unit containing the azobenzene residue was 1. A macromolecular compound (2)/liquid crystal mixture prepared in the same manner as in Example 1 was interposed between two glass substrates having the surface treated in advance with n-octadecyl trichlorosilane by the conventional method through the medium of glass rod spacers 8 μm in thickness to complete a liquid crystal cell. The liquid crystal cell obtained as described above showed the same response to light as in Example 1.

EXAMPLE 3

Between two glass substrates spin coated in advance with a 1% dioxane solution of the macromolecular compound (2) of Example 2, a cyanobiphenyl type liquid crystal (produced by Rodic and marketed as of "RO-571") was interposed through the medium of spacers 8 μm in thickness, to complete a cell. In this cell, the liquid crystal molecules were oriented horizontally and showed no response to light. When this cell was annealed in the neighborhood of the liquid crystal phase-isotropic phase transition point for 30 minutes and then cooled to room temperature, an adsorbed thin film of the macromolecular compound (2) was formed on the substrates and the cell began to respond to the light in the same manner as in Example 1.

EXAMPLE 4

A polyvinyl alcohol (3) having an azobenzene residue contained in a ratio of 0.3 in the constitutional unit of the macromolecular compound was obtained by heating for several hours completely saponified polyvinyl alcohol having a polymerization degree of 500 and 4-(4-hexylphenylazo)phenoxyacetyl chloride synthesized by the conventional method in a dimethyl formamide-benzene mixed solvent. Between cleaned untreated glass substrates, a macromolecular compound (3)/DON 103 liquid crystal mixture prepared in the same manner as in Example 1 was interposed through the medium of spacers 8 μm in thickness to complete a cell. The liquid crystal cell thus obtained showed the same response to light as in Example 1.

EXAMPLE 5

In 3 ml of thionyl chloride, 440 mg of 6-[4-(4-hexylphenylazo)-phenoxy]hexanoic acid was dissolved. The resultant solution was refluxed for 30 minutes and then subjected to vacuum distillation. In 5 ml of pyridine, the resultant acid chloride and 130 mg of parahydroxy polystyrene (molecular weight about 8,000) were heated and stirred at 100° C. for 3 hours. By repeating precipitation from methanol, there was obtained 228 mg of a substituted polystyrene (4) wherein the constitutional unit containing the azobenzene group had a unit ratio of about 1.

A 1% dioxane solution of the macromolecular compound (4) was applied with a roller coater on a glass substrate to form a film. Between two such glass substrates, a phenyl cyclohexane carboxylate type nematic liquid crystal (DON 103) was interposed through the medium of spacers 8 μm in thickness, to complete a cell. In this liquid crystal, the initial orientation was in the vertical direction. It showed a change of vertical orientation-horizontal orientation in response to the alternate exposure to the ultraviolet light and visible light.

What is claimed is:

1. A photorecording element consisting essentially of:
    a transparent substrate;
    a layer of macromolecular compound consisting of a photochromic residue and a backbone polymer, deposited by adsorption on said transparent substrate, and capable of undergoing a reversible change in structure upon exposure to light, a unit ratio of said photochromic residue to said backbone polymer being at least 0.1; and
    a liquid crystal layer deposited directly on said layer of macromolecular compound.

2. A photorecording element according to claim 1, wherein said backbone polymer is one member selected from the group consisting of polyvinyl alcohols, polyimide resin, poly(meth)acrylic esters, poly(meth)acrylic amides, and polystyrene.

3. A method for the production of a photorecording element of claim 1, comprising the steps of:
    applying to a transparent substrate a mixture of a liquid crystal substance and a macromolecular compound which consists of a photochromic residue and a backbone polymer and is capable of undergoing a reversible change in structure upon exposure to light, a unit ratio of said photochromic residue to said backbone polymer being at least 0.1; and
    allowing the applied mixture to stand at rest.

4. A method according to claim 3, wherein said backbone polymer is one member selected from the group consisting of polyvinyl alcohols, polyimide resin, poly(meth)acrylic esters, poly(meth)acrylic amides, and polystyrene.

5. A method according to claim 3, wherein the application of said mixture of liquid crystal substance and said macromolecular compound to said transparent substrate is effected by spin coating.

6. A method for the production of a photorecording element of claim 1, comprising the steps of:
    applying to a transparent substrate a macromolecular compound which consists of a photochromic residue and a backbone polymer and is capable of undergoing a reversible change in structure upon exposure to light, a unit ratio of said photochromic residue to said backbone polymer being at least 0.1; and
    applying a liquid crystal substance to the applied macromolecular compound.

7. A method according to claim 6, wherein said backbone polymer is one member selected from the group consisting of polyvinyl alcohols, polyimide resin, poly(meth)acrylic esters, poly(meth)acrylic amides, and polystyrene.

8. A method according to claim 6, wherein the application of said macromolecular compound to said transparent substrate is effected by spin coating.

9. A liquid crystal cell consisting essentially of:
    a liquid crystal layer;
    two layers of macromolecular compound consisting of a photochromic residue and a backbone polymer, deposited one each on opposite surfaces of said liquid crystal layer, and capable of undergoing a reversible change in structure upon exposure to light, a unit ratio of said photochromic residue to said backbone polymer being at least 0.1; and
    two substrates, at least one of which is transparent, upon said substrates said two layers of macromolecular compound are deposited, each by adsorption thereon.

10. A liquid crystal cell according to claim 9, wherein said backbone polymer is one member selected from the group consisting of polyvinyl alcohols, polyimide resin, poly(meth)acrylic esters, poly(meth)acrylic amides, and polystyrene.

* * * * *